Figure 1:
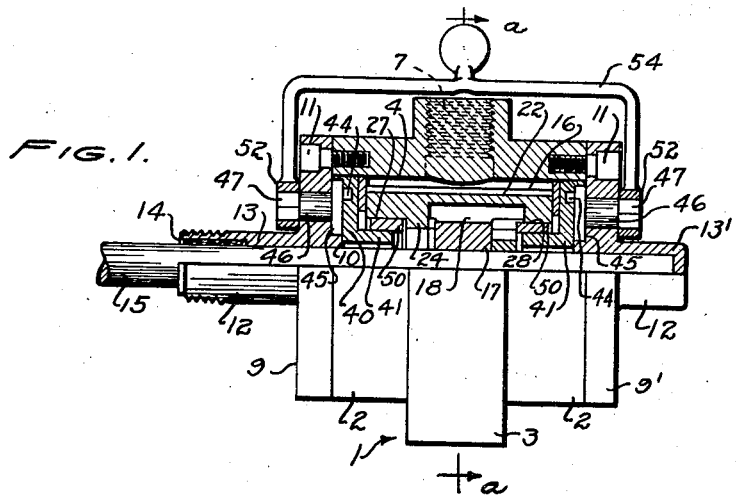

Feb. 17, 1942.    R. E. GREY    2,273,034
PUMP
Filed Feb. 26, 1941    2 Sheets-Sheet 1

INVENTOR
RALPH E. GRAY
BY
ATTORNEYS

Feb. 17, 1942.    R. E. GREY    2,273,034
PUMP
Filed Feb. 26, 1941    2 Sheets-Sheet 2
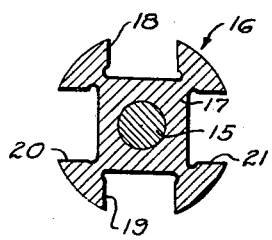
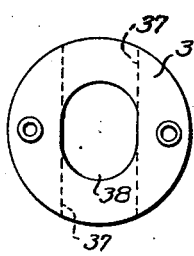
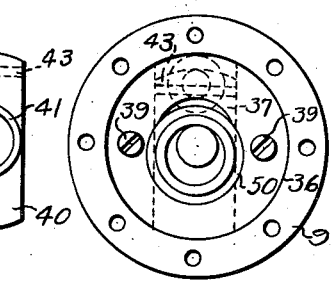
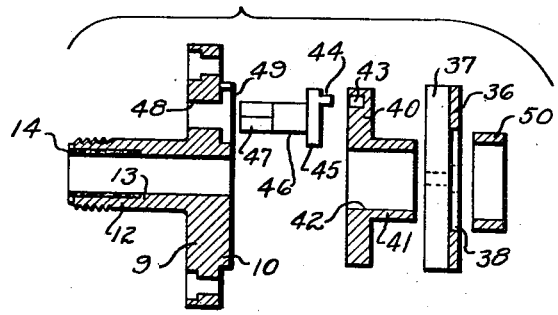
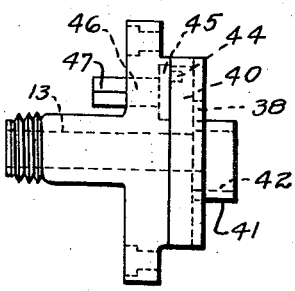
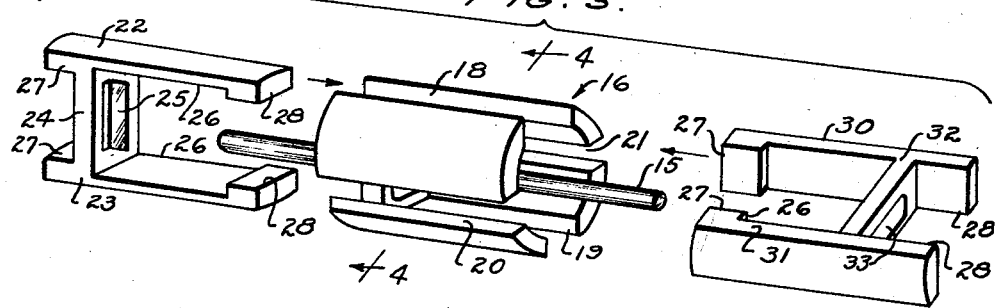
INVENTOR
RALPH E. GRAY
BY
ATTORNEYS Patented Feb. 17, 1942

2,273,034

UNITED STATES PATENT OFFICE 2,273,034

PUMP

Ralph E. Grey, Fairfield, Ohio

Application February 26, 1941, Serial No. 380,688

7 Claims. (Cl. 103—38)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a reversible delivery variable displacement pump of general application, but particularly suited as a pressure generator in a variable speed hydraulic power transmission including a hydraulic fluid motor connected by suitable conduits to the variable displacement pump, such transmissions being well known in the art. The pump in accordance with the present invention may be employed in combination with a fluid motor to drive an aircraft fuel pump at speeds dependent upon the quantity of fluid required to maintain a constant fuel pressure in the float chamber of the engine carburetor such as disclosed in United States Patent No. 2,183,586, the amount of delivery of the power transmission pump being manually controlled preferably in unison with the engine throttle control to thereby control the speed of the hydraulic motor driving the fuel pump.

The pump in accordance with the invention comprises a fixed pump barrel or casing provided with a pair of ports communicating with a central longitudinal bore in the casing. The casing houses a rotor driven by a shaft extending through one end of the stationary casing. The rotor has cooperating therewith one or more pairs of interconnected reciprocating pistons which reciprocate in apertures within the rotor, thus forming expansible chambers which are brought alternately into communication with the ports in the fixed casing by rotation of the rotor. The pistons rotate about a pair of crank pins or bearing journals which may be simultaneously shifted eccentrically to either side of the axis of rotation of the rotor shaft to thereby reverse the pump delivery and also vary the pump displacement from zero when the center of the eccentrics or crank pins coincide with the axis of the rotor shaft, to a maximum value when the crank pins are moved to a maximum eccentricity with respect to the rotor shaft axis. The eccentricity of the crank pins is simultaneously controlled through suitable mechanism from a control member exterior of the pump casing. The shiftable crank pins are located at opposite ends of the pump casing and thus serve to prevent any rocking of the pistons due to actuation of the stroke varying mechanism and also permits the pistons to be formed of a rectangular shape reciprocating in rectangular slots formed in the pump rotor, giving a construction by which a maximum displacement is obtained for a minimum piston stroke. The rectangular pistons have a length equal to the length of the rotor and bear upon sealing discs located at opposite ends of the bore in the pump casing.

The principal object of the invention is the provision in a variable displacement pump, of a stationary pump casing with a rotor and driving shaft within the casing, opposed pairs of interconnected pistons carried by the rotor and reciprocable therein, of a pair of oppositely spaced coaxial crank pins arranged parallel to the axis of the rotor shaft and shiftable relative thereto and means for journalling the respective pairs of pistons for rotation about the common axis of the crank pins.

Another object of the invention is the provision in a pump of the character described, of a fixed casing having end walls and a pair of fluid ports within the casing, a slotted rotor within the casing having one or more pairs of rectangular opposed interconnected pistons reciprocable in the slots of said rotor and engaging the end walls of said casing, a pair of coaxial, spaced, shiftable crank pins each supported by a respective end wall of the casing and the said pistons being journalled on said crank pins for rotation about the axis thereof.

Other objects of the invention not specifically enumerated above will apear by reference to the description in the specification and the appended drawings in which—

Figure 11:
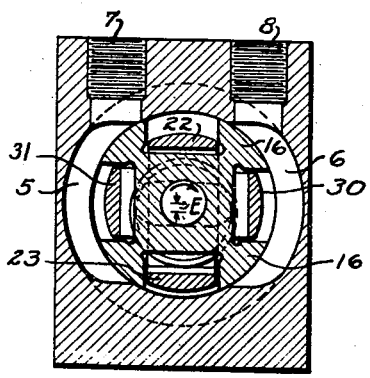
Figure 2:
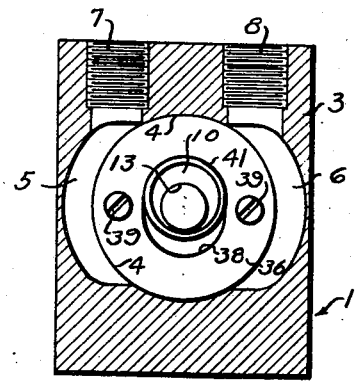
Figure 12:
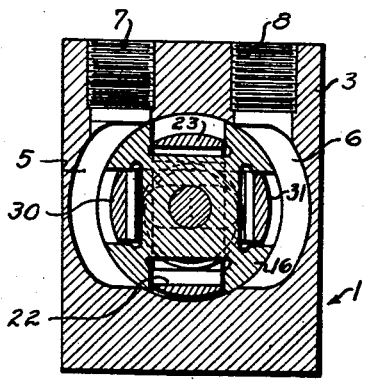
Figure 10:
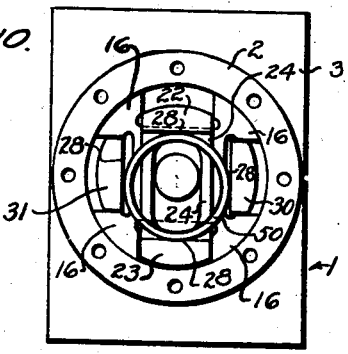

Fig. 1 is a side elevation partly in section illustrating the construction of one form of pump in accordance with the invention; and Fig. 2 is a sectional view taken on line a—a of Fig. 1 with the pump rotor assembly removed; and Fig. 3 is an isometric exploded view illustrating the construction and manner of assembly of the pump rotor and pump pistons; and Fig. 4 is a view illustrating the cross section of the pump rotor taken on line 4—4 of Fig. 3; and Fig. 5 is a rear elevation of one of the pump housing end covers illustrating the piston stroke adjusting mechanism; and Fig. 6 is a view illustrating the construction of a crosshead and crank pin employed in the assembly of Fig. 5; and Fig. 7 is a view illustrating the construction of a crosshead guide and sealing ring employed in the assembly of Fig. 5; and Fig. 8 is an exploded longitudinal sectional view of the elements of the assembly of Fig. 5; and Fig. 9 is a side elevation of the assembly of Fig. 5; and Fig. 10 is an end view of the pump with the cover plate removed illustrating the bearing engagement of the pistons with the crank pin bearing ring; and Fig. 11 is a sectional view taken on line a—a of Fig. 1 with the pump rotor and piston assembly in one position; and Fig. 12 is a view similar to Fig. 11 showing the pump rotor and piston assembly rotated to a position one hundred and eighty degrees removed from the position illustrated in Fig. 11.

Referring now to Figure 1, the reference numeral 1 indicates a pump casing having cylindrical portions 2 extending on either side of a rectangular central portion 3. The pump casing 1 is provided with a longitudinally extending cylindrical bore 4, which as seen in Fig. 2 communicates with each of a pair of arcuate fluid ports 5 and 6 respectively, which are formed in the central portion 3 of the pump casing, the ports 5 and 6 respectively connecting to fluid passages 7 and 8 also formed in the central portion 3 of the pump casing and suitably threaded for connection to external fluid conduits not shown. The cylindrical bore 4 forming the main pump chamber is closed at each end by means of cover plates 9 and 9' respectively, each of which is fitted with extension flanges 10 which extend within the bore 4 and each of the cover plates being secured to the casing portions 2 by means of screws 11. The cover 9 is provided with a bearing boss 12 formed integral therewith and provided with a central passage 13 and packing gland 14 to suitably journal and seal a driving shaft 15, which extends within the pump casing concentric with the longitudinal axis of the chamber 4. The cover plate 9' is identical in all respects with the cover plate 9, with the exception that the central boss 12 is provided with a blind bore 13', which serves to journal the inner end of the driving shaft 15. The driving shaft 15 is adapted to drive a rotor 16 which is closely fitted to rotate within the cylindrical bore or chamber 4 of the pump casing 1.

Referring to Figures 3 and 4, the rotor 16 is seen to be constructed in the form of a cylindrical annulus having a narrow central spider 17 which serves to secure the rotor to the driving shaft 15. The rotor 16 is provided with a number of longitudinally extending slots 18, 19, 20 and 21 respectively, which are arranged in diametrically opposed pairs. The slots 18 and 19 serve as guides and also as rectangular shaped cylinders respectively for the rectangular shaped pistons 22 and 23 which are interconnected by means of integral link 24 which is provided with an elongated slot 25 which is adapted to be passed over one end of the driving shaft 15, and to allow the reciprocation of the pistons 22 and 23 in the rotor slots 18 and 19. Each of the pistons 22 and 23 is cut away or recessed as indicated at 26 to clear the central rotor spider 17 and each of the pistons is provided with a bearing face 27 and 28 respectively on the underside of each end thereof. A pair of rectangular pistons 30 and 31 connected by rigid link 32, which is provided with an elongated slot 33 is arranged to cooperate with the rectangular rotor slots 20 and 21 respectively. The pistons 30 and 31 being provided with recessed portions 26 and bearing faces 27 and 28 in the same manner as the pistons 22 and 23 as noted above. Each of the pistons is curved on its outer surface with a radius of curvature equal to the radius of the rotor 16, but the overall distance between the outer surfaces of the respective pairs of pistons is smaller than the diameter of the rotor 16 by an amount equal to the maximum pump stroke which is desired to be obtained. The exploded view in Figure 3 clearly indicates the manner in which the pairs of pump pistons are assembled into the rotor slots for cooperation with the pump rotor 16.

The means for varying the pump pistons' stroke to thereby vary the delivery of the pump in either direction is illustrated in Figures 5 to 9 inclusive. This stroke-varying structure being formed as a pair of identical units, each mounted on a respective one of the cover plates 9 and 9' and illustrated in Figures 5 to 9 inclusive with respect to the cover plate 9, the mechanism associated with the cover plate 9' being of identical construction. The stroke adjusting mechanism comprises a circular bearing plate 36 (Fig. 7) which is provided on its rear side with a slot or groove 37 and provided with a centrally disposed elongated slot 38 which is provided with circular ends, the bearing plate 36 being secured to the flange extension 10 of the cover plate 9 by means of countersunk screws 39. A link block or crosshead 40 (Fig. 6) of rectangular shape and having curved ends corresponding in curvature to the pump bore 4 is arranged to slide in the slot or groove 37 of the bearing plate 36, the crosshead being provided with a centrally disposed integral crank pin 41 which is provided with a central aperture 42 having a diameter greater than the diameter of the driving shaft 15 of Figure 1, the crank pin 41 extending through the slotted opening 38 of the bearing plate 36. The crosshead 40 is provided with a shallow transverse slot 43 which is adapted to be engaged by a small crank pin 44, Figs. 8 and 9, integrally formed on a small crank disc 45 carried by a stub shaft 46. The shaft 46 is provided with a squared end 47 and is adapted to be journaled in a bearing journal 48, formed in the cover plate 9 which is suitably counterbored as at 49 to receive the crank disc 45 flush with the cover plate flange extension 10. A hardened steel crank pin bearing ring 50 is adapted to be slipped over the portion of crank pin 41 which projects beyond the bearing plate 36, as illustrated in Figure 9. As will be apparent from the exploded view in Figure 8 and the assemblies illustrated in Figures 5 and 9, that when the shaft 46 is rotated in either direction, the small crank pin 44 on the crank disc 45 will cause reciprocation of the crosshead 40, causing the hollow crank pin 41 and bearing ring 50 to be shifted eccentrically with respect to the center line of the driving shaft journal 13.

When the stroke adjusting mechanism is assembled in the pump as illustrated in Figures 1 and 10, the bearing rings 50 engage the undersides of the respective pistons at the bearing faces 27 and 28 located on the opposite ends of the pistons (Fig. 3) and as seen in Figure 1, the squared ends 47 of the actuating shafts 46 which project through the cover plates 9 and 9' are engaged by sockets 52 formed on the ends of a forked lever 54 mounted externally and straddling the pump casing 1. If the forked lever 54 is rotated in either direction about the common axis of the shafts 46, the eccentricity of the hollow crank pin 41 and the bearing ring 50 may be varied from zero to a maximum amount in either direction with respect to the axis of the driving shaft 15.

Operation

The operation of the pump of Figure 1 can best be understood by reference to Figures 11 and 12. Referring to Figure 11, and it will be assumed that the passage 7 is connected to the return side of a hydraulic transmission or pump inlet conduit, and that the passage 8 is connected to suitable conduit forming the pump delivery conduit, and that the rotor 16 is rotated in a clockwise direction with the pump pistons in the position as shown. With the space above the piston 22 occupied by liquid received from the port 5, as the rotor is rotated from the position shown, the piston 22 will move outward to displace liquid into the port 6 to the outlet passage 8, the pump piston 22 moving outward until it reaches a position diametrically opposite to the position as illustrated in Figure 11 to the position such as illustrated in Figure 12. While the pump piston 22 as seen in Figure 11 is moving radially outward, the pump piston 23 connected thereto will move from the maximum outward position radially inward during the time that it is in communication with the inlet port 5, drawing in the fluid in the space above the piston until the piston 23 occupies the position as illustrated in Figure 12. The pistons 30 and 31 are reciprocated in the respective slots 20 and 21 of the pump rotor 16 to respectively draw in the fluid from port 5 and discharge fluid to the port 6 in a similar manner. As clearly illustrated in Figures 11 and 12, the width of the rectangular pump rotor slots serving as cylinders for the respective pump pistons is less than the distance between the adjacent upper and lower edges of the ports 5 and 6, so that the pump rotor 16 effectively seals the space between the ports and prevents leakage from the inlet to the discharge side of the pump. It will also be clear that while the pump rotor 16 is rotating about the fixed axis of the driving shaft 15, the pump pistons rotate about the common axis of the crank pins 41 and crank pin bearing rings 50, the piston stroke being governed by the eccentricity e of the crank pin axis with respect to the axis of the rotation of the pump rotor 16. If the crank pin axis is shifted to be above the axis of rotation of the rotor 16, then the action of the pump will be reversed and the pistons will be moving radially inward as the piston chambers come into communication with the port 5, thus causing the port 6 to become an inlet port and the port 5 to become a fluid discharge port, reversing the pump delivery to thereby reverse the direction of rotation of a fluid motor connected to the pump in a manner well known in the art. If the common axis of the crank pins 41 is made to coincide with the axis of rotation of the rotor 16, then both the pump pistons and the pump rotor will rotate about a common axis so that there will be no reciprocation of the pistons relative to the pump rotor and hence the delivery of the pump will be zero. It is thus seen that the pump delivery may be made to vary from zero to a maximum value determined by the maximum possible eccentricity of the crank pin axis in either direction depending upon the direction of rotation of the stroke adjustment control lever 54 (Fig. 1) from its neutral position. By employing rectangular pistons it is possible to obtain a large pump capacity for a very small overall diameter of the pump casing and by employing separate but interconnected stroke varying mechanism respectively acting on opposite ends of the piston, all tendency towards rocking of the pistons in the rotor slots is eliminated, and the ends of the pistons may then be allowed to contact the bearing faces of the discs 36 to form an effective seal for the ends of the rotor slots forming the piston chambers.

While the novel variable displacement pump in accordance with the invention has been illustrated in conjunction with rectangular pistons, it is obvious that the same form of stroke adjusting mechanism and variable delivery control may be employed in a pump using cylindrical pistons. The only change being that the pump rotor be provided with corresponding circular openings to cooperate with round pistons, the pistons being interconnected in pairs by slotted links and the underface of the pistons being allowed to engage the crank pin bearing rings 50 in the same manner as the rectangular pistons illustrated in the drawings.

While one form of the invention has been illustrated and described, other modifications thereof will be apparent to those skilled in the art as falling within the scope of the invention as defined by the appended claims.

I claim:

1. A variable displacement pump comprising a stationary casing, a longitudinally extending cylindrical bore in said casing, a pair of fluid ports communicating with the bore in said casing, a driving shaft, a rotor rotatably mounted within the bore in said casing and driven by said shaft, a pair of oppositely disposed interconnected pistons carried by said rotor and reciprocable within chambers formed in said rotor, a pair of spaced coaxial crank pins carried by said casing, bearings carried by each respective crank pin and engaging each of said pistons on opposite sides of the center line thereof to cause said pistons to rotate about the common crank pin axis and means operable from external of said casing for simultaneously shifting said crank pins so that the crank pin axis is eccentric with respect to the axis of rotation of said rotor.

2. The structure as claimed in claim 1, in which the means for simultaneously shifting said crank pins is operable to shift the crank pin axis to either side of the axis of rotation of said rotor.

3. The structure as claimed in claim 1, in which said crank pins are formed as hollow sleeves surrounding said driving shaft.

4. A reversible variable delivery pump comprising a fixed pump barrel, a cylindrical chamber in said barrel, a pair of removable cover plates for sealing the respective ends of said chamber, a pair of fluid ports in said barrel communicating with said chamber on opposite sides thereof, a driving shaft journalled in at least one of said cover plates and extending within said chamber concentric therewith, a chambered rotor mounted on said shaft within said cylindrical chamber and operative during rotation of said rotor to bring each of said rotor chambers successively into communication with each of said fluid ports, a plurality of oppositely disposed interconnected pairs of pistons carried by said rotor and each reciprocable in one of said rotor chambers, a pair of coaxial crank pins each respectively carried by one of said cover plates, means for journalling each of said pairs of pistons on said crank pins for rotation about the common crank pin axis, said pistons thereby being supported on opposite sides of the center line thereof, and means controlled from the exterior of said pump barrel for simultaneously shifting said crank pins so that the common axis thereof is eccentric with respect to the axis of rotation of said rotor 5. The structure as claimed in claim 4, in which each of said crank pins is made in the form of an annular sleeve surrounding said driving shaft and having an inside diameter greater than the outside diameter of said driving shaft.

6. In a fluid pump, a pump casing, a cylindrical chamber in said casing, a pair of fluid ports communicating with said chamber, a driving shaft extending through said chamber, a rotor mounted on said shaft and adapted to seal said ports from communication with each other, said rotor sealingly engaging the end walls of said chamber, a plurality of oppositely located slots in said rotor extending the length thereof, a plurality of rectangular pistons each reciprocable in one of said slots in engagement with the end walls of said chamber, opposed pairs of said pistons being interconnected, a pair of coaxial crank pins each supported by a respective end wall of said cylindrical pump chamber, said crank pins being in the form of annular sleeves surrounding the rotor drive shaft, a bearing carried by each of said crank pins and directly engaging a bearing face on the underside of each of said pistons at opposite sides of the center line thereof, whereby when the common axis of said crank pins is eccentric with respect to the axis of rotation of said driving shaft the pistons will reciprocate in the rotor slots to cause a pumping action.

7. In a fluid pump, a pump casing, a cylindrical chamber in said casing, a pair of fluid ports communicating with said chamber, a driving shaft extending through said chamber, a rotor mounted on said shaft and adapted to seal said ports from communication with each other, said rotor sealingly engaging the end walls of said chamber, a plurality of oppositely located slots in said rotor extending the length thereof, a plurality of rectangular pistons each reciprocable in one of said slots in sealing engagement with the end walls of said chamber, opposed pairs of said pistons being interconnected, a pair of coaxial crank pins each supported by a respective end wall of said cylindrical pump chamber, the said crank pins being in the form of annular sleeves surrounding the rotor driving shaft, and means for simultaneously shifting said crank pins so that their common axis is eccentric with respect to the axis of rotation of said rotor.

RALPH E. GREY.